(12) United States Patent
Joet et al.

(10) Patent No.: US 12,739,571 B2
(45) Date of Patent: Sep. 15, 2026

(54) ELECTROMECHANICAL SYSTEM COMPRISING TWO MOVABLE ELEMENTS SIDE BY SIDE

(71) Applicant: COMMISSARIAT Á L'ENERGIE ATOMIQUE ET AUX ENERGIES ALTERNATIVES, Paris (FR)

(72) Inventors: Loïc Joet, Grenoble Cedex (FR); Gokhan Hatipoglu, Redwood City, CA (US)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 97 days.

(21) Appl. No.: 18/760,593

(22) Filed: Jul. 1, 2024

(65) Prior Publication Data

US 2026/0006389 A1 Jan. 1, 2026

(51) Int. Cl.
*H04R 19/04* (2006.01)
*G01L 13/06* (2006.01)

(52) U.S. Cl.
CPC .............. *H04R 19/04* (2013.01); *G01L 13/06* (2013.01); *H04R 2201/003* (2013.01)

(58) Field of Classification Search
CPC ........ H04R 19/00; H04R 19/02; H04R 19/04; H04R 2201/003; H04R 2400/11; B81B 2203/053; B81B 2203/058
See application file for complete search history.

(56) References Cited

U.S. PATENT DOCUMENTS

2021/0021944 A1* 1/2021 Joet .......................... B81B 5/00

FOREIGN PATENT DOCUMENTS

FR 3 059 659 B1 5/2019
FR 3 114 584 B1 9/2022

* cited by examiner

*Primary Examiner* — Sunita Joshi

(74) *Attorney, Agent, or Firm* — CUSHMAN PARTNERS, LLC

(57) ABSTRACT

An electromechanical system includes a frame; a first element movable relative to the frame; a capacitive measurement or actuation system including a first electrode movable relative to the frame; and at least one electrode fixed relative to the frame and separated from the first movable electrode by a first dielectric medium; a first movement transmission device connecting the first movable element to the first movable electrode, the first transmission device being rotatably movable relative to the frame by a plurality of first pivot hinges; a second element movable relative to the frame, the second movable element being connected to the capacitive measurement or actuation system, the first movable element being disposed between the capacitive measurement or actuation system and the second movable element.

13 Claims, 7 Drawing Sheets

ELECTROMECHANICAL SYSTEM COMPRISING TWO MOVABLE ELEMENTS SIDE BY SIDE

TECHNICAL FIELD OF THE INVENTION

The technical field of the invention is that of electromechanical systems, especially of the microelectromechanical systems (MEMS) or nanoelectromechanical systems (NEMS) type. The invention relates more particularly to an electromechanical system comprising a movable element, capacitive measurement or actuation means and a device for transmitting a movement between the movable element and the capacitive measurement or actuation means. Such a system can be used as an electroacoustic transducer (e.g. microphone, loudspeaker, etc.) or as a differential pressure sensor.

TECHNOLOGICAL BACKGROUND TO THE INVENTION

Microelectromechanical or nanoelectromechanical microphones represent a rapidly expanding market, especially by virtue of the development of nomadic apparatuses such as tablets, smartphones and other connected objects, in which they are gradually replacing electret microphones.

Microphones measure a rapid variation in atmospheric pressure, also known as acoustic pressure. They therefore include at least one part in contact with the outside world.

Most MEMS or NEMS microphones manufactured today are capacitive detection microphones. FIG. 1 represents an example of a capacitive detection microphone 1, described in patent FR3114584B1.

The microphone 1 comprises a frame (not shown) delimiting at least in part a first zone 11 and a second zone 12, an element 13 movable relative to the frame and a device 14 for transmitting movement between the first zone 11 and the second zone 12. The first and second zones 11-12 of the microphone 1 are sealingly insulated from each other.

The movable element 13, also known as the piston, is in contact with the first zone 11 and comprises a membrane 131 and a structure 132 for rigidifying the membrane. The role of the membrane 131 of the piston 13 is to collect, over its entire surface, a pressure difference between its two faces, in order to deduce a variation in atmospheric pressure. One face of the membrane 131 is subjected to atmospheric pressure (the variation in which we wish to detect) and an opposite face of the membrane 131 is subjected to a reference pressure.

Furthermore, the microphone 1 comprises capacitive detection means 15 disposed in the second zone 12. These capacitive detection means 15 make it possible to measure the displacement of the piston 13, and therefore the difference in pressure between its two faces. They preferably comprise a movable electrode 151 and at least one fixed electrode disposed opposite the movable electrode 151. The electrodes form the plates of a capacitor whose capacitance varies as a function of the displacement of the piston 13.

The transmission device 14 is mounted so that it can rotate relative to the frame, by means of several pivot hinges 16. The transmission device 14 comprises two first transmission arms 141 extending in the first zone 11, two second transmission arms 142 extending in the second zone 12 and two transmission shafts 143 extending partly in the first zone 11 and partly in the second zone 12. Each transmission shaft 143 connects a first transmission arm 141 to a second transmission arm 142.

Each first transmission arm 141 comprises a first end coupled to the piston 13 and a second opposite end coupled to the associated transmission shaft 143. Each second transmission arm 142 comprises a first end coupled to the movable electrode 151 of the capacitive detection means 15 and a second, opposite end coupled to the associated transmission shaft 143.

Patent FR3059659B1 describes a capacitive detection microphone similar to that of FIG. 1. The capacitive detection means comprise a movable electrode and two fixed electrodes between which the movable electrode is disposed. The electrodes form the plates of two capacitors whose capacitances vary in opposite directions to the displacement of the piston. The measurement of piston displacement is therefore a differential measurement.

To achieve this differential measurement, the capacitors are first charged by applying a DC bias voltage between the movable electrode and the fixed electrodes via a high resistance. The movement of the piston results in a variation in the capacitances, and therefore a variation in the voltage between the fixed electrodes (the charge of the capacitors being substantially constant at audible frequencies, typically above 100 Hz) which can be read by an instrumentation amplifier.

These capacitive detection microphones can fail due to a phenomenon known as "pull-in", which is common to all electromechanical systems comprising capacitive measurement or actuation means. This pull-in phenomenon is caused by the electrostatic force, which tends to bring the movable electrode closer to the fixed electrode (or to one of the fixed electrodes) and which depends on the square of the polarisation voltage. The electrostatic force, which also depends on the displacement of the movable electrode, can be approximated to first order by a constant force plus the force exerted by a spring of negative rigidity for small displacements.

To avoid (up to a certain point) this pull-in phenomenon, an elastic force is opposite to the electrostatic force. This elastic force can be generated by springs connecting the movable electrode frame 151 to the microphone frame 1. The greater the rigidity of the springs, the greater the voltage value at which the electrostatic force overcomes the elastic force (known as the "pull-in voltage") and the higher the voltage at which the movable electrode 151 can be biased. This is advantageous because the sensitivity of microphone 1 increases with the bias voltage.

A drawback of the capacitive detection microphones described above is that energy is lost in the deformation of the piston 13, the transmission device 14 and the frame of the movable electrode 151, which represents a loss of useful signal when detecting dynamic pressure variations. One solution for reducing these energy losses, and therefore increasing the sensitivity of the microphone, would be to reinforce the rigidifying structure 132 for the piston 13, the transmission device 14 and the frame of the movable electrode 151. However, this solution would considerably increase the mass of these movable parts, reducing the resonant frequency of the microphone.

SUMMARY OF THE INVENTION

There is therefore a need to provide an electromechanical system with capacitive detection or capacitive actuation which offers better performance, especially in terms of sensitivity and resonance frequency.

According to the invention, this need tends to be met by providing an electromechanical system comprising:

a frame;

a first element movable relative to the frame; and capacitive measurement or actuation means comprising:

a first electrode movable relative to the frame; and at least one electrode fixed relative to the frame and separated from the first movable electrode by a first dielectric medium;

a first movement transmission device connecting the first movable element to the first movable electrode, the first transmission device being rotatably movable relative to the frame by means of a plurality of first pivot hinges.

This electromechanical system is remarkable in that it further comprises a second element movable relative to the frame, in that the second movable element is connected to the capacitive measurement or actuation means and in that the first movable element is disposed between the capacitive measurement or actuation means and the second movable element.

Preferably, the first movement transmission device further connects the second movable element to the first movable electrode.

Preferably, the capacitive measurement or actuation means further comprise:

a second electrode movable relative to the frame; and at least one additional electrode fixed relative to the frame and separated from the second movable electrode by a second dielectric medium;

and the system further comprises a second movement transmission device connecting the first movable element and the second movable element to the second movable electrode, the second transmission device being rotatably movable relative to the frame by means of a plurality of second pivot hinges.

In a preferred embodiment, the first transmission device comprises:

a first transmission shaft having a first longitudinal axis of rotation;

at least one first transmission arm comprising a first end coupled to the first movable element and a second end integral with the first transmission shaft; and at least one second transmission arm comprising a first end coupled to the second movable element and a second end integral with the first transmission shaft.

Preferably, each of the first and second movable elements comprises a membrane and a membrane rigidifying structure.

Further to the characteristics just discussed in the previous paragraphs, the electromechanical system according to the invention may have one or more additional characteristics among the following, considered individually or according to all technically possible combinations:

the second movable element is connected to the first movable electrode;

the capacitive measurement or actuation means further comprise:

a second electrode movable relative to the frame; and at least one additional electrode fixed relative to the frame and separated from the second movable electrode by a second dielectric medium;

and the second movable element is connected to the second movable electrode;

the first transmission device is situated on a first side of the membrane of the first (respectively second) movable element and the rigidifying structure of the first (respectively second) movable element comprises a first beam situated on the first side of the membrane, the first beam extending in the direction of the length of the first (respectively second) movable element, preferably along a median line of the first (respectively second) movable element;

the first beam has a length greater than or equal to 50% of the length of the first (or second) movable element;

the first beam has a thickness of between 5 μm and 800 μm;

the rigidifying structure of the first (or second) movable element further comprises a second beam located on a second opposite side of the membrane and superimposed on the first beam;

the second beam has a thickness strictly less than that of the first beam, preferably between 5 μm and 50 μm;

the rigidifying structure of the first (respectively second) movable element further comprises edges located on a second opposite side of the membrane and extending perpendicularly to the first beam;

the first movable element and the second movable element are identical;

the first movable element and the second movable element are not identical;

at least one of the first pivot hinges is located at the first movable electrode;

another of the first pivot hinges is located at one end of the first transmission device;

another of the first pivot hinges is located between the first and second movable elements;

at least one of the second pivot hinges is located on the second movable electrode;

another of the second pivot hinges is located at one end of the second transmission device;

another of the second pivot hinges is located between the first and second movable elements;

the first movable element and the second movable element are in contact with a first zone and the first movable electrode is located in a second zone sealed from the first zone;

the first and second movable elements are in translation relative to the frame;

the first and second movable elements rotate relative to the frame;

the first movable electrode is connected to the first transmission shaft;

the first movable electrode is integral with the first transmission shaft, with the result that the first movable electrode is mounted so as to be rotatably movable about the first longitudinal axis of rotation;

the second transmission device comprises:

a second transmission shaft having a second longitudinal axis of rotation;

at least one third transmission arm comprising a first end coupled to the first movable element and a second end integral with the second transmission shaft; and at least one fourth transmission arm comprising a first end coupled to the second movable element and a second end integral with the second transmission shaft;

the second movable electrode is connected to the second transmission shaft;

the second movable electrode is integral with the second transmission shaft, whereby the second movable electrode is mounted so as to be rotatably movable about the second longitudinal axis of rotation.

DESCRIPTION OF THE FIGURES

Further characteristics and advantages of the invention will be clear from the description given below, by way of indication and by no means limitatively, with reference to the appended figures, of which.

For the sake of clarity, identical or similar elements are marked by identical reference signs throughout the figures.

DETAILED DESCRIPTION

Figure 1:
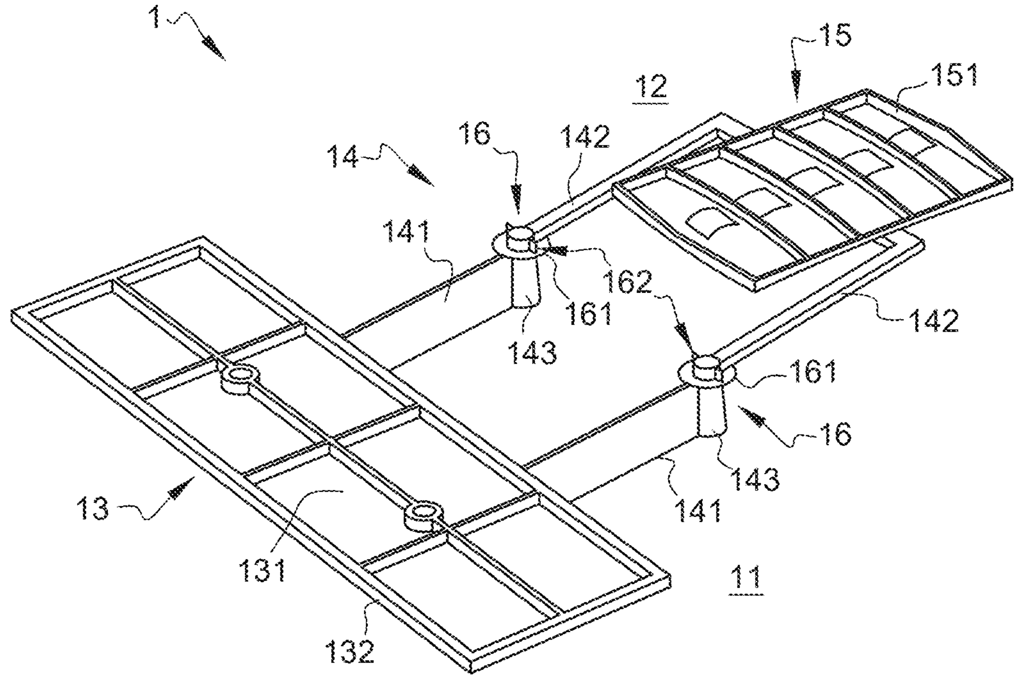
FIG. 1 is a partial perspective view of a capacitive detection microphone according to prior art.

FIGS. 2, 3 and 4A to 4B represent part of an electromechanical system 2 with capacitive detection or capacitive actuation according to a first embodiment. This electromechanical system 2 may form an electroacoustic transducer, for example a microphone or a loudspeaker, or a differential pressure sensor. In the following description, the example of a microphone with capacitive detection will be taken.

The electromechanical system 2 comprises:

- a frame 10;
- a movable element 13 in contact with a first zone 11;
- capacitive detection (or measurement) means 15' comprising a first electrode 151 movable relative to the frame 10, a second electrode 152 movable relative to the frame 10, the first and second movable electrodes 151-152 being located in a second zone 12 sealed from the first zone 11; and
- a first device 14*a* for transmitting movement between the movable element 13 and the first movable electrode 151 (in other words between the first zone 11 and the second zone 12); and
- a second device 14*b* for transmitting movement between the movable element 13 and the second movable electrode 152.

Figure 2:
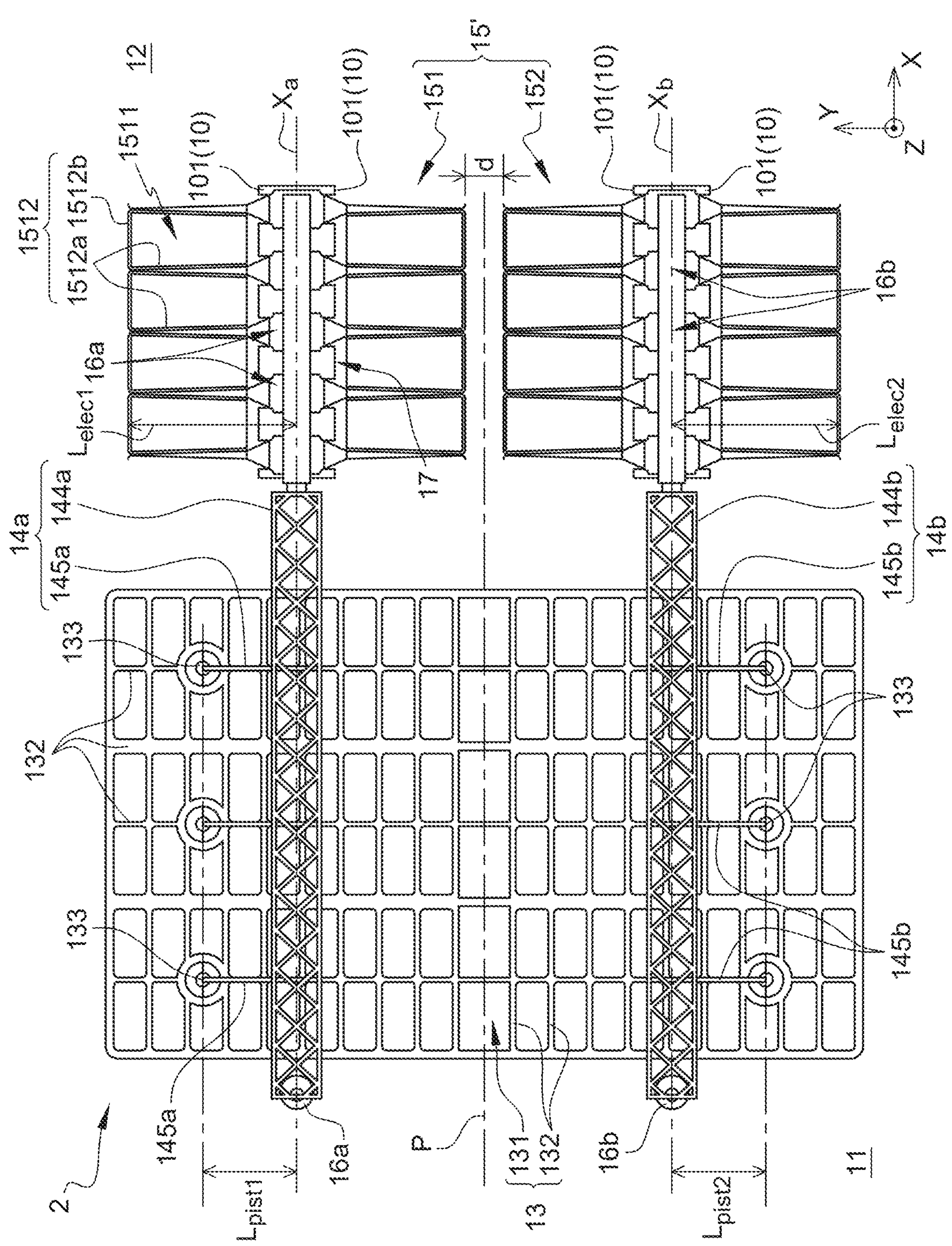
FIG. 2 is a partial bottom view of an electromechanical system according to a first embodiment, this electromechanical system comprising capacitive detection or actuation means.
Figure 3:
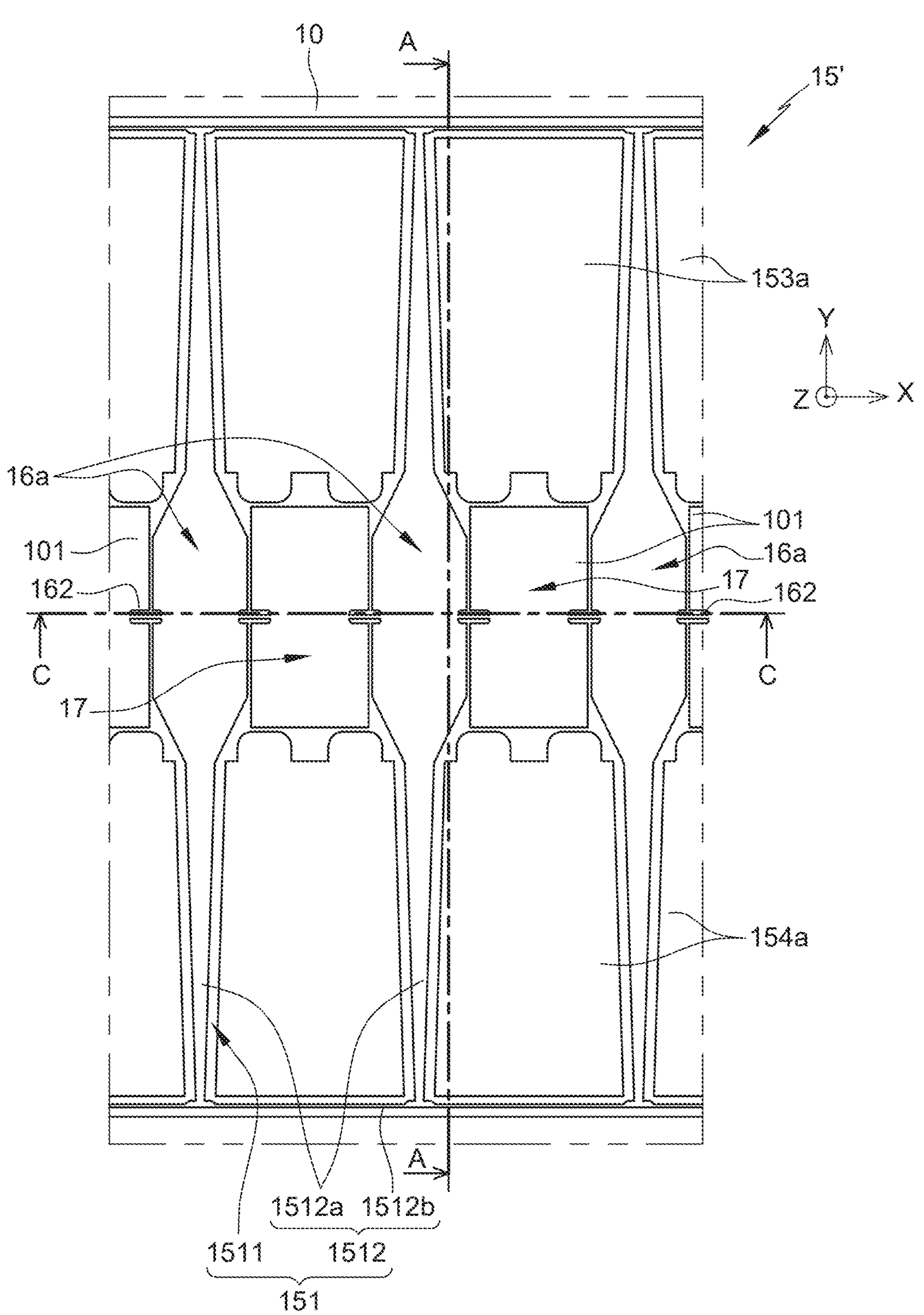
FIG. 3 is a partial top view of the capacitive detection or actuation means of the electromechanical system of FIG. 2.
Figure 4A:
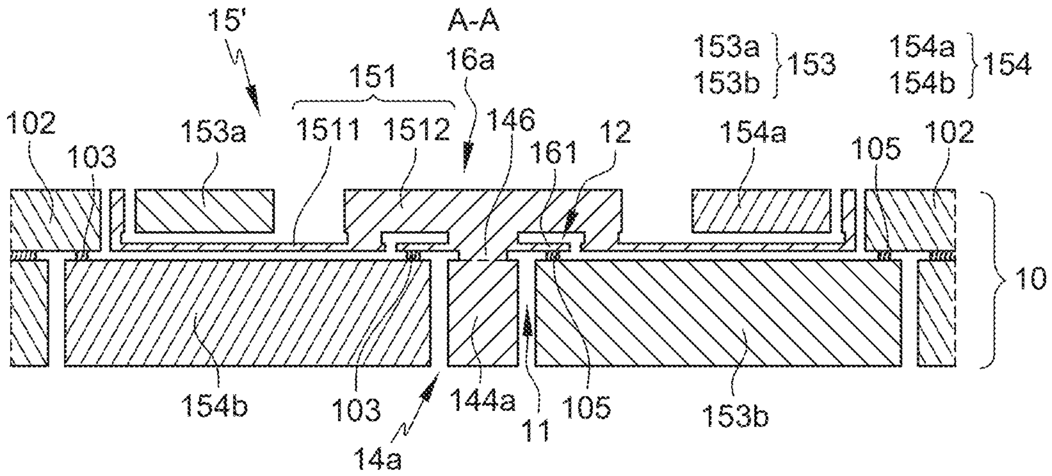
FIG. 4A is a cross-sectional view of the electromechanical system according to plane A-A in FIG. 3.
Figure 4B:
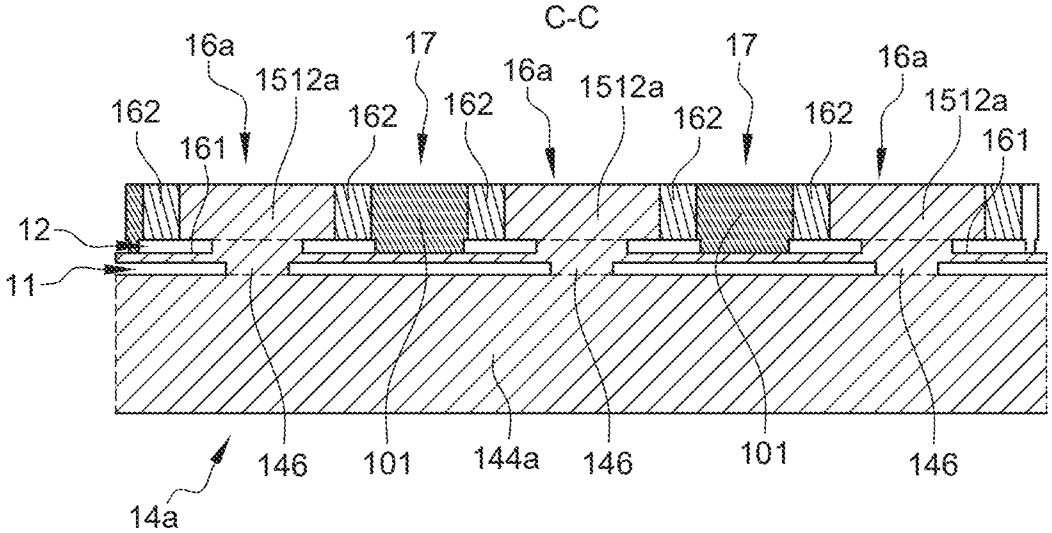
FIG. 4B is a cross-sectional view of the electromechanical system according to plane C-C in FIG. 3.

FIG. 2 is a bottom view of the electromechanical system 2 showing first portions 101 of the frame 10, the movable element 13, the transmission devices 14*a*-14*b* and the movable electrodes 151-152 of the capacitive detection means 15'. FIG. 3 is a top view showing only part of the capacitive detection means 15' (including the first movable electrode 151). FIGS. 4A and 4B are different cross-sectional views of the electromechanical system 2, respectively according to the planes A-A and C-C represented in FIG. 3. They represent in part the frame 10, the first transmission device 14*a* and the capacitive detection means 15'.

The frame 10 is made up of fixed parts of the electromechanical system 2.

The movable element 13, hereinafter referred to as the piston, is movable in translation relative to the frame 10, according to a direction (Z) perpendicular to the plane (XY) of FIG. 2. It preferably comprises a membrane 131 and a rigidifying structure 132 for rigidifying the membrane 131, also referred to as a skeleton or armature. The role of the membrane 131 of the piston 13 is to collect, over its entire surface, a pressure difference between its two faces, in order to deduce a variation in atmospheric pressure.

The membrane 131 of the piston 13 can partly delimit a closed reference volume, where a reference pressure prevails. It separates this reference volume from a cavity open to the outside environment. One face of the membrane 131 is therefore subjected to the reference pressure and an opposite face of the membrane 131 is subjected to atmospheric pressure (the variation of which is to be detected in the case of a microphone). Alternatively, the reference volume can be quasi-closed, in the sense that there is a trench around the piston (which is cut away). This trench allows the piston to move and allows air to leak between the reference volume and the outside. This leakage is small so that pressures can equalise slowly, filtering out only low-frequency pressure variations.

The first zone 11 encompasses the cavity open to the outside environment, subjected to atmospheric pressure, and the reference volume subjected to the reference pressure.

The capacitive detection means 15' measure the displacement of the piston 13, and therefore the pressure difference between its two faces. Further to the first and second movable electrodes 151-152, they comprise at least one fixed electrode (with respect to the frame 10), separated from the first movable electrode 151 by a first dielectric medium, and at least one additional fixed electrode, separated from the second movable electrode 152 by a second dielectric medium.

Each movable electrode and associated fixed electrode(s) form the armatures of one or more capacitors whose capacitance varies as a function of the displacement of the piston 13. The fixed electrodes may also be called "counter-electrodes".

The first dielectric medium and the second dielectric medium are not solid (but preferably consist of a gas or a mixture of gases), so as not to hinder the movement of the movable electrodes 151. The second dielectric medium is identical to the first dielectric medium, as the movable electrodes 151-152 are both located in the second zone 12.

Advantageously, the second zone 12 is a controlled atmosphere chamber to reduce the phenomena of viscous friction and the associated acoustic noise. By "controlled atmosphere chamber", it is meant a chamber under reduced pressure, typically less than 1000 mbar, and preferably less than 1 mbar. Thus, the second zone 12 is subjected to a pressure well below atmospheric pressure or the reference pressure.

The first transmission device 14*a* is mounted so that it can rotate relative to the frame 10, by means of several first pivot hinges 16*a*. It comprises a first transmission shaft 144*a* and one or more first transmission arms 145*a*, also known as lever arms.

The first transmission shaft 144*a* has a first longitudinal axis of rotation Xa (hereinafter designated first axis Xa), which extends in a first direction X. In other words, the first transmission shaft 144*a* can pivot on itself, about the first axis Xa. It extends opposite the piston 13, opposite a zone located between the piston 13 and the first movable electrode 151 and opposite the first movable electrode 151.

Advantageously, the first movable electrode 151 is integral with the first transmission shaft 144*a*, which means that there is no relative movement between the first movable electrode 151 and the first transmission shaft 144*a*. The first movable electrode 151 is therefore also mounted so that it can rotate about the first axis Xa.

The electromechanical system 2 is thus devoid of members for transforming the movement between the first transmission device 14*a* and the first movable electrode 151, such as torsion blades for switching from rotation to translation. As a result, no energy is lost in these transformation members (for example, by deformation of the torsion blades).

The first transmission arms 145*a*, for example three in number in FIG. 2, can extend perpendicular to the first axis Xa, in other words in a second direction Y perpendicular to the first direction X. The first and second directions X-Y together with a third perpendicular direction Z form an orthogonal reference frame.

Each first transmission arm 145*a* comprises a first end coupled to the piston 13 and a second end integral with the first transmission shaft 144*a*. One or more coupling elements 133 connect the rigidifying structure 132 for the piston 13 to the first end of each first transmission arm 145*a*. At least some of the coupling elements 133 (for example torsion blades) allow the transition from a translational movement (piston 13) to a rotational movement (first transmission shaft 144*a* and first movable electrode 151) while strongly coupling their displacement according to the third direction Z. These coupling elements 133 are able to deform elastically.

The translational movement of the piston 13 causes the first transmission arms 145*a*, and therefore the first transmission shaft 144*a*, to rotate about the first axis Xa. This rotational movement is then transmitted to the first movable electrode 151.

The first pivot hinges 16*a*, for example six in number, are aligned, here in the first direction X. Preferably, one of the first pivot hinges 16*a* is located at the end of the first transmission shaft 144*a*, on the piston 13 side (i.e. opposite to the first movable electrode 151), while other first pivot hinges 16*a* are located on the first movable electrode 151 side. As will be described in detail below, the first movable electrode 151 is preferably connected to the first transmission shaft 144*a* at these other first pivot hinges 16*a*.

The second transmission device 14*b* is also mounted so as to be rotatably movable relative to the frame 10, by means of second pivot hinges 16*b*. It is constructed in the same way as the first transmission device 14*a*. More particularly, it comprises a second transmission shaft 144*b* having a second longitudinal axis of rotation Xb (hereinafter designated second axis Xb) and second transmission arms 145*b* (three, for example). Each second transmission arm 145*b* comprises a first end coupled (via one or more coupling elements 133) to the piston 13 and a second end integral with the second transmission shaft 144*b*. The second transmission arms 145*b* preferably extend perpendicularly to the second axis Xb.

The second movable electrode 152 is advantageously integral with the second transmission shaft 144*b* and therefore rotates about the second axis Xb.

The second pivot hinges 16*b* are preferably distributed along the second axis Xb in the same way as the first pivot hinges 16*a* are distributed along the first axis Xa (one of them is located at the end of the second transmission shaft 144*b* and others are located at the second movable electrode 152).

The first transmission arms 145*a* are coupled to a first half of the piston 13 (the upper half in FIG. 2) and the second transmission arms 145*b* are coupled to a second half of the piston 13 (the lower half in FIG. 2). Thus, the transmission devices 14*a*-14*b* support the piston 13 and hold it in translation. Preferably, the piston 13 is held solely by the first and second transmission arms 145*a*-145*b*. Thus, a greater proportion of the energy collected by the piston 13 is transmitted to the movable electrodes 151-152.

As illustrated in FIG. 2, the first axis Xa and the second axis Xb are advantageously parallel. This helps to reduce the overall size of the electromechanical system 2 and provides uniform support for the piston.

The first movable electrode 151 and the second movable electrode 152 can be identical and disposed symmetrically with respect to a plane P separating the first and second halves of the piston 13. This symmetry makes it possible to obtain an identical reaction on the two halves of the piston so that the latter is held securely in translation.

The first transmission device 14*a* and the second transmission device 14*b* can also be symmetrical with respect to the plane P. The first transmission shaft 144*a* and the first movable electrode 151 then pivot in one direction (about the first axis Xa), while the second transmission shaft 144*b* and the second movable electrode 152 pivot in the opposite direction (about the second axis Xb).

The piston 13 can also be symmetrical with respect to the plane P.

The symmetries of the piston 13 and the transmission devices 14*a*-14*b* enable the energy collected by the piston 13 to be distributed equally between the first movable electrode 151 and the second movable electrode 152, in that the force exerted by the piston 13 is distributed equally between the first and second halves, and therefore between the first and second transmission devices 14*a*-14*b*.

The rotational mounting of the first movable electrode 151 and the second movable electrode 152, according to the same axis of rotation as the first transmission device 14*a* and the second transmission device 14*b* respectively, makes it possible to obtain a greater displacement of the movable electrodes 151-152 for a given displacement of the piston 13, without however increasing the overall size of the electromechanical system 2. The movable electrodes 151-152 can therefore be as close as possible to the piston 13.

The change from one movable electrode (FIG. 1) to two movable electrodes (FIG. 2) does not significantly increase the overall size of the electromechanical system 2 either, as the two movable electrodes 151-152 can be disposed opposite each other in the extension of the piston 13.

The displacement of each movable electrode 151, 152 relative to that of the piston 13 is concerned with the distance $L_{pist1}$, $L_{pist2}$ between the first end of the transmission shafts 145*a*, 145*b* and the corresponding axis of rotation Xa, Xb. This distance may be of the same order of magnitude as the distance $L_{elec1}$, $L_{elec2}$ between a longitudinal edge (i.e. according to X) of the movable electrode 151, 152 and the axis of rotation Xa, Xb.

More precisely, the displacement in Z of the longitudinal edge of the first movable electrode 151 is given by the following relationship:

[Math. 1]

$$d_{Zelec1} = \frac{L_{elec1}}{L_{pist1}} \times d_{Zpist}$$

where $d_{zpist}$ is the displacement in Z of the piston 13 (and therefore of all the first ends of the first and second transmission arms 145*a*-145*b*), $L_{elec1}$ is the distance between the longitudinal edge of the first movable electrode 151 and the first axis Xa and $L_{pist1}$ is the distance between the first end of each first transmission arm 145*a* and the first axis Xa.

The Z displacement of the longitudinal edge of the second movable electrode 152 is given by the following relationship:

[Math. 2]

$$d_{Zelec2} = \frac{L_{elec2}}{L_{pist2}} \times d_{Zpist}$$

where $L_{elec2}$ is the distance between the longitudinal edge of the second movable electrode 152 and the second axis Xb and $L_{pist2}$ is the distance between the first end of each second transmission arm 14*b* and the second axis Xb.

The transmission shafts 144*a*-144*b* and the transmission arms 145*a*-145*b* can be particularly rigid, and therefore not very sensitive to deformations which are equivalent to energy losses. This rigidity of the transmission shafts 144*a*-144*b* and the transmission arms 145*a*-145*b* can especially be conferred by a large thickness (measured in the third direction Z), preferably between 5 μm and 800 μm, and more preferably between 50 μm and 200 μm. The transmission shafts 144*a*-144*b* and the transmission arms 145*a*-145*b* are advantageously formed by etching a substrate. This substrate can be thinned to a thickness of less than 200 μm.

As the transmission shafts 144*a*-144*b* rotate on themselves, their inertia remains low and does not have a negative impact on the resonance frequency of the electromechanical system 2. However, they can be pierced, as illustrated in FIG. 2, in order to optimise their rigidity to inertia ratio. The transmission shafts 144*a*-144*b* are preferably pierced at least in the portion facing the piston 13. This further reduces squeeze film damping with the piston 13, which is a source of noise.

The width of the transmission shafts 144*a*-144*b* (measured in the first direction Y) is of the same order of magnitude as their thickness, in order to minimise their inertia. Advantageously, it is between 5 μm and 800 μm.

The capacitive detection means 15' will now be described in more detail, with reference only to the first movable electrode 151 (connected to the first transmission device 14*a*). Nevertheless, this description applies mutatis mutandis to the second movable electrode 152 (connected to the second transmission device 14*b*), since it may be identical to the first electrode 151. Similarly, the description that will be given of the first pivot hinges 16*a* applies to the second pivot hinges 16*b*.

With reference to FIGS. 2 and 3, the first electrode 151 may comprise a membrane 1511 and a rigidifying structure 1512 of the membrane 1511. The rigidifying structure 1512 preferably comprises a plurality of first beams 1512*a* extending parallel to one another. It may further comprise second beams 1512*b* connecting the first beams 1512*a* at their ends.

The first beams 1512*a* preferably extend in the second direction Y, advantageously from a first edge to an opposite second edge of the first movable electrode 151. They are advantageously evenly spaced from one another, to rigidify the membrane 1511 uniformly. The second beams 1512*b* preferably extend in the first direction X (i.e. perpendicularly to the first beams 1512*a*).

The first movable electrode 151 advantageously has one or more planes of symmetry, for example a plane parallel to the XZ plane (therefore perpendicular to the first beams 1512*a*) and another plane parallel to the YZ plane.

The rigidifying structure 1512 of the first movable electrode 151 is advantageously anchored, or fused, to the first transmission device 14*a* at a part of the first pivot hinges 16*a*. Compared with the microphone 1 of FIG. 1, the electrostatic system 2 therefore lacks the second transmission arms 142 extending into the second zone 12.

More particularly, the rigidifying structure 1512 of the first movable electrode 151 is connected to the first transmission device 14*a*, and more particularly to the first transmission shaft 144*a*, by pillars 146 visible in FIGS. 4A and 4C. The pillars 146 of the first transmission device 14*a* are similar to the transmission shafts 143 of FIG. 1, in that they extend partly into the first zone 11 and partly into the second zone 12. Sealing between the first zone 11 and the second zone 12 also takes place at the first pivot hinges 16*a* associated with the first movable electrode 151.

The first transmission device 14*a* is thus reduced to first elements extending exclusively in the first zone 11 (the first transmission shaft 144*a* and the first transmission arms 145*a*) and to second elements (the pillars 146) which extend partly in the first zone 11 and partly in the second zone 12. This reduction of the first transmission device 14*a* makes it possible to limit energy losses. In particular, there are no more losses due to deformation of the second transmission arms 142.

The electromechanical system 2 is particularly compact, as several functions, namely rotation of the first transmission device 14*a*, sealing between the two zones 11-12 and connection to the first movable electrode 151, are carried out at the same point.

Anchoring between the rigidifying structure 1512 and the first transmission device 14*a* is preferably achieved by means of the first beams 1512*a*. At least some of these are fused to the first transmission device 14*a*, each at a corresponding first pivot hinge 16*a*. The anchoring point of each first beam 1512*a* is advantageously located halfway along its length. Thus, the axis of rotation of the first movable electrode 151 lies in one of the planes of symmetry of the first movable electrode 151 (that perpendicular to the first beams 1512*a*). The length of the first beams 1512*a* is measured in the second direction Y, while their width is measured in the first direction X.

Each first beam 1512*a* merged with the first transmission device 14*a* advantageously has a width which decreases away from the corresponding first pivot hinge 16*a*. In other words, the width of the first beams 1512*a* is at its maximum at the level of the first pivot hinges 16*a*.

In this first embodiment of the electromechanical system 2, each of the first beams 1512*a* of the rigidifying structure 1512 is fused to the first transmission device 14*a*. In other words, each first beam 1512*a* is associated with a first pivot hinge 16*a*. The number of first pivot hinges 16*a* on the side of the first movable electrode 151 is therefore equal to the number of first beams 1512*a*. This arrangement makes it possible to create a space 17 between two successive first pivot hinges 16*a*.

For each first pivot hinge 16*a*, the frame 10 may comprise two separate first portions 101 disposed on either side of the first beam 1512*a* associated with the first pivot hinge. The first beam 1512*a* is preferably connected to each of the first portions 101 of the frame 10 by a torsion bar 162 (see FIG. 3).

As represented by FIGS. 3, 4A and 4B, the capacitive detection means 15' preferably comprise two counter-electrodes 153-154 associated with the first movable electrode 151: a first counter-electrode 153 referred to as positive and a second counter-electrode 154 referred to as negative.

Preferably, at least part of the membrane 1511 of the first movable electrode 151 is located between the two counter-electrodes 153-154 (see FIGS. 4A-4B). The first movable electrode 151 and the counter-electrodes 153-154 thus form the armatures of two capacitors whose capacitances vary in opposite directions. A differential measurement of the displacement of the piston 13 can thus be obtained. The surfaces of the counter-electrodes 153-154 facing the first movable electrode 151 are advantageously identical, by virtue of a symmetry of the first movable electrode 151 and of the counter-electrodes 153-154 with respect to the first pivot hinges 16*a* (the plane of symmetry coincides with the sectional plane C-C).

Advantageously, each of the counter-electrodes 153, 154 comprises a first portion 153*a*, 154*a* and a second portion 153*b*, 154*b* located on either side of the membrane 1511 and on either side of the first pivot hinges 16*a*. The first portion 153*a*, 154*a*, known as the upper portion, and the second portion 153*b*, 154*b*, known as the lower portion, of the same counter-electrode are electrically connected. This arrangement makes it possible to obtain a fully differential measurement, even if the distance between the membrane 1511 and the upper portions 153*a*-154*a* of the counter-electrodes (referred to as the upper air gap) is different from the distance between the membrane 1511 and the lower portions 153*a*-154*a* of the counter-electrodes (lower air gap).

The lower portions 153*b*-154*b* of the counter-electrodes 153-154 extend under the first beams 1512*a* of the rigidifying structure 1512, on either side of the first pivot hinges 16*a*. In contrast, the upper portions 153*a*-154*a* of the counter-electrodes 153-154 are preferably each divided into a plurality of blocks (or sub-portions) separated by the first beams 1512*a*, as illustrated in FIG. 3. As the upper portions 153*a*-154*a* of the counter-electrodes 153-154 are inscribed in the rigidifying structure 1512, their surface area facing the membrane 1511 is smaller than that of the lower portions 153*b*-154*b*.

With reference to FIG. 4A, the lower portions 153*b*-154*b* of the counter-electrodes 153-154 are preferably secured to an annular portion 102 of the frame 10, located at the periphery of the first movable electrode 151, by means of annular seals 103, 105 made of an electrically insulating material (one annular seal per lower portion 153*b*, 154*b*). These annular seals 103, 105, for example made of silicon oxide, further ensure the seal between the first zone 11 and the second zone 12.

Alternatively, the capacitive detection means 15' may comprise (for each movable electrode) a single counter-electrode (lower or upper), two counter-electrodes (upper and lower but situated on one side only of the pivot hinges 16) (pseudo-differential detection) or two lower or upper counter-electrodes disposed on either side of the pivot hinges 16 (differential detection).

As indicated previously, the seal between the first and second zones 11-12 of the electromechanical system 2 can be made at the first pivot hinges 16*a* located on the side of the first movable electrode 151. As illustrated in FIGS. 4A and 4B, each first pivot hinge 16*a* associated with the first movable electrode 151 comprises a sealed insulating element 161, able to deform elastically under the effect of the rotational displacement of the first transmission device 14*a*. The sealed insulating element 161 is preferably in the form of a sealing membrane.

Each sealed insulating element 161 is preferably passed through by an associated pillar 146 of the first transmission device 14*a*. The sealed insulating element 161 extends, for example, from the associated pillar 146 to the lower portions 153*b*-154*b* of the counter-electrodes 153-154 (see FIG. 4A) and to the first portions 101 of the frame 10 (see FIG. 4B), to which it is anchored by virtue of the annular seals 103, 105 made of electrically insulating material.

Furthermore, each first pivot hinge 16*a* (associated with the first movable electrode 151) advantageously comprises two torsion blades 162 (one per first portion 101 of the frame 10). The torsion blades 162 are dimensioned so as to be able to deform (elastically) in torsion and allow the first transmission device 14*a* and the first movable electrode 151 to rotate, while limiting their translational movements, especially according to the third direction Z (so-called "out-of-plane" translation). The two torsion blades 162 connect the rigidifying structure 1512 of the first movable electrode 151 (fused to the pillar 146 of the first transmission device 14*a*) to the first portions 101 of the frame 10 (see also FIG. 4C). They are preferably aligned and disposed diametrically opposite to the first beam 1512*a* associated with the first pivot hinge 16*a*.

The first pivot hinge 16*a* located at the end of the first transmission shaft 144*a* advantageously comprises a sealed insulating element 161 (preferably in the form of a membrane) and two torsion blades 162, but does not participate in the sealing between the first and second zones 11-12 (being located only in the first zone 11).

The electromechanical system 2 comprises elastic means connected to the first movable electrode 151 and configured to generate an elastic force which opposes to the movement of the first movable electrode 151. The role of these elastic means is to combat the pull-in phenomenon of the first movable electrode 151. Their rigidity influences the pull-in voltage (or "pull-in voltage" of the system), and therefore the ability to bias the first movable electrode 151.

The elastic "anti-pull-in" means connect (mechanically) the rigidifying structure 1512 of the first movable electrode 151 to the frame 10 and/or to elements integral with the frame, such as the counter-electrodes 153-154, possibly via the pillars 146 of the first transmission device 14*a*. Thus, the rigidity of the first transmission device 14*a* or the rigidity of the rigidifying structure 1511 itself are not considered to be "anti-pull-in" elastic means.

The "anti-pull-in" elastic means comprise the sealed insulating elements 161 and, if necessary, the torsion blades 162. The watertight insulating elements 161 and the torsion blades 162 thus fulfil several functions simultaneously.

The anti-pull-in elastic means are connected to the rigidifying structure 1512 where it is most rigid, i.e. at the first pivot hinges 16*a*. Thus the rigidity of the anti-pull-in spring means is not degraded by elements in series of too low rigidity. Furthermore, this rigidity can be easily controlled by adjusting the dimensions of the watertight insulating elements 161 and the torsion blades 162. The sealed insulating elements 161 can be defined by anisotropic etching of a sacrificial layer ($SiO_2$, for example) and are produced in a structural layer of controlled thickness. This type of etching gives good control over the dimensions of the sealed insulating elements 161. As a result, the rigidity of the sealed insulating elements 161 shows little dispersion (mainly between the different electromechanical systems manufactured on the same wafer or on different wafers).

The second movable electrode 152 is advantageously connected to the second transmission device 14*b* in the same way as the first movable electrode 151 is connected to the first transmission device 14*a*. Thus, the electromechanical system 2 also comprises "anti-pull-in" elastic means connected to the second movable electrode 152, these elastic means preferably comprising the sealed insulating elements 161 and, if necessary, the torsion blades 162 of the second pivot hinges 16*b*.

The sealed insulating elements 161 and, if necessary, the torsion blades 162, advantageously constitute the only "anti-pull-in" means of the electromechanical system 2. Thus, the electromechanical system 2 is particularly compact.

The electromechanical system 2 described above can be manufactured by virtue of the methods described in patents FR3059659B1 and FR3114584B1, especially starting from a stack of layers comprising successively a substrate, a first sacrificial layer and a first structural layer. The stack can especially be a multilayer structure of the silicon-on-insulator (SOI) type, commonly known as an SOI substrate.

The substrate is especially used for etching the first elements of the transmission devices 14*a*-14*b* (transmission shafts 144*a*-144*b* and transmission arms 145*a*-145*b*), the lower portions 153*b*-154*b* of the counter-electrodes 153-154 and part of the frame 10. The substrate may be made of a semiconductor material, for example silicon.

The first structural layer serves especially to produce the membrane 131 of the piston 13, the membrane 1511 of the movable electrodes 151-152 and the sealed insulating elements 161 (sealing membranes). Its thickness is less than that of the substrate, preferably between 100 nm and 10 μm. It is preferably made of the same material as the substrate, for example silicon.

The first sacrificial layer is intended to disappear in part during manufacture of the electromechanical system 2 to free the membrane 131 of the piston 13, the membrane 1511 of the movable electrodes 151-152 and the sealed insulating elements 161. Its thickness especially defines the distance between the membrane 1511 and the lower portions 153*b*-154*b* of the counter-electrodes 153-154 (lower air gap). This layer also serves as a stop layer during etching of the substrate, the membrane 152*a* and the second structural layer (the "MEMS" layer described later). The remaining parts of the first sacrificial layer form the annular seals 103, 105 and the lower pillars 104. The first sacrificial layer can be made of a dielectric material, preferably a silicon nitride or a silicon oxide, for example silicon dioxide (SiO2). Its thickness is, for example, between 100 nm and 10 μm.

As described in the aforementioned patents, a second sacrificial layer is deposited onto the first structural layer and a second structural layer is formed on the second sacrificial layer, preferably by epitaxy.

The second structural layer is etched to delimit at least part of the rigidification structure 132 of the piston 13, the rigidification structure 1512 of the movable electrodes 151-152, the torsion blades 162, the upper portions 153*a*-154*a* of the counter-electrodes 153-154, the first portions 101 and the second annular portion 102 of the frame 10. Advantageously, it is made of the same material as the first structural layer, for example silicon. The thickness of the second structural layer is preferably between 5 μm and 50 μm.

The rigidifying structure 1512 of each movable electrode 151, 152 is fused to the corresponding transmission device 14*a*, 14*b*, by growing the second structural layer directly from the substrate, at the location of the pivot hinges 16*a*, 16*b* (the first and second sacrificial layers having been opened beforehand). The pillars 146 of the transmission devices 14*a*, 14*b* are formed during this epitaxial growth.

The second sacrificial layer serves especially as a stop layer during etching of the second structural layer. It is partly removed to free the membrane 131 of the piston 13, the membrane 1511 of the movable electrodes 151-152 and the sealed insulating elements 161. Its thickness defines the distance between the membrane 1511 and the upper portions 153*a*-154*a* of the counter-electrodes 153-154 (upper air gap). The second sacrificial layer is advantageously formed from the same dielectric material as the first sacrificial layer, for example silicon oxide. Its thickness can be between 100 nm and 10 μm.

Figure 5:
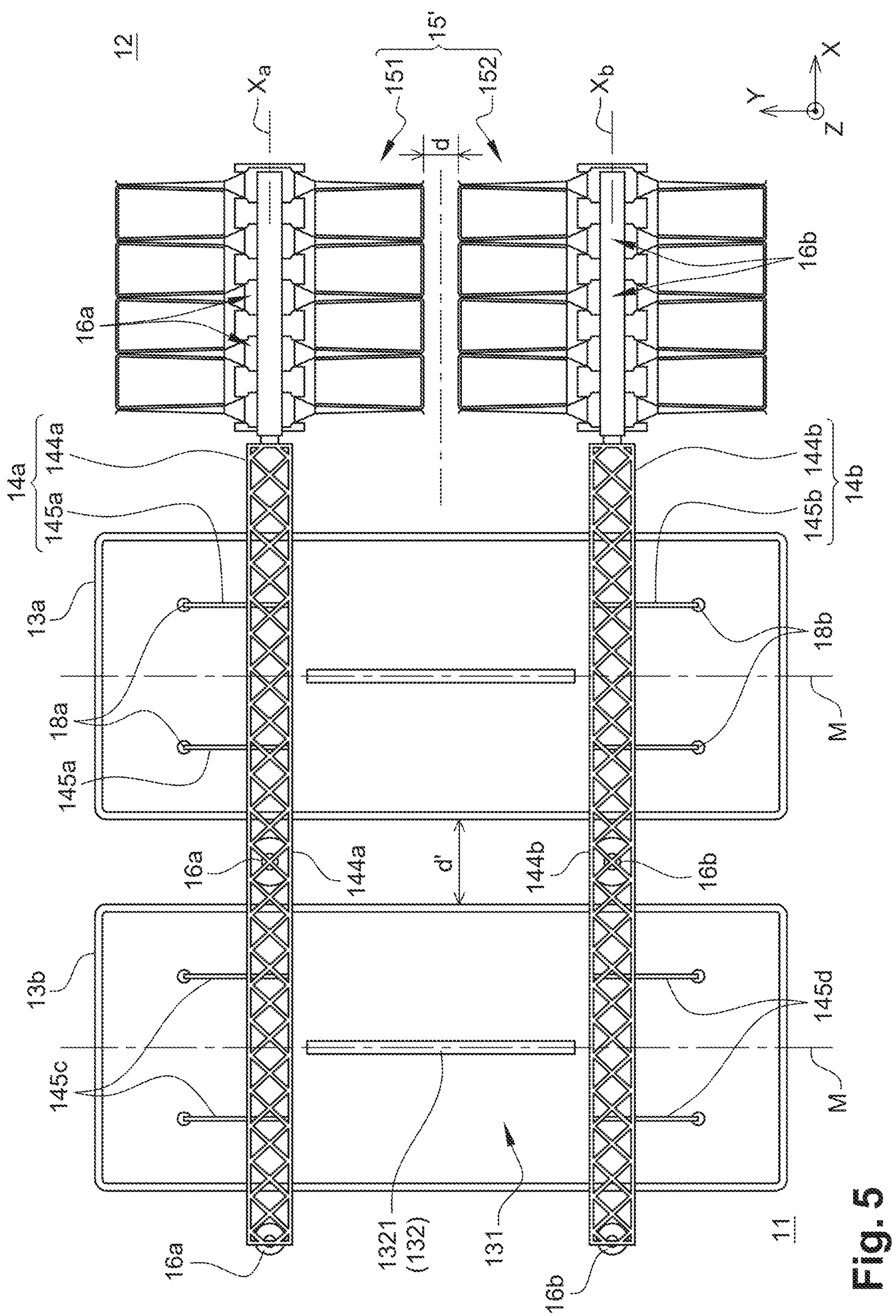
FIG. 5 is a partial bottom view of an electromechanical system according to a second embodiment.
Figure 6:
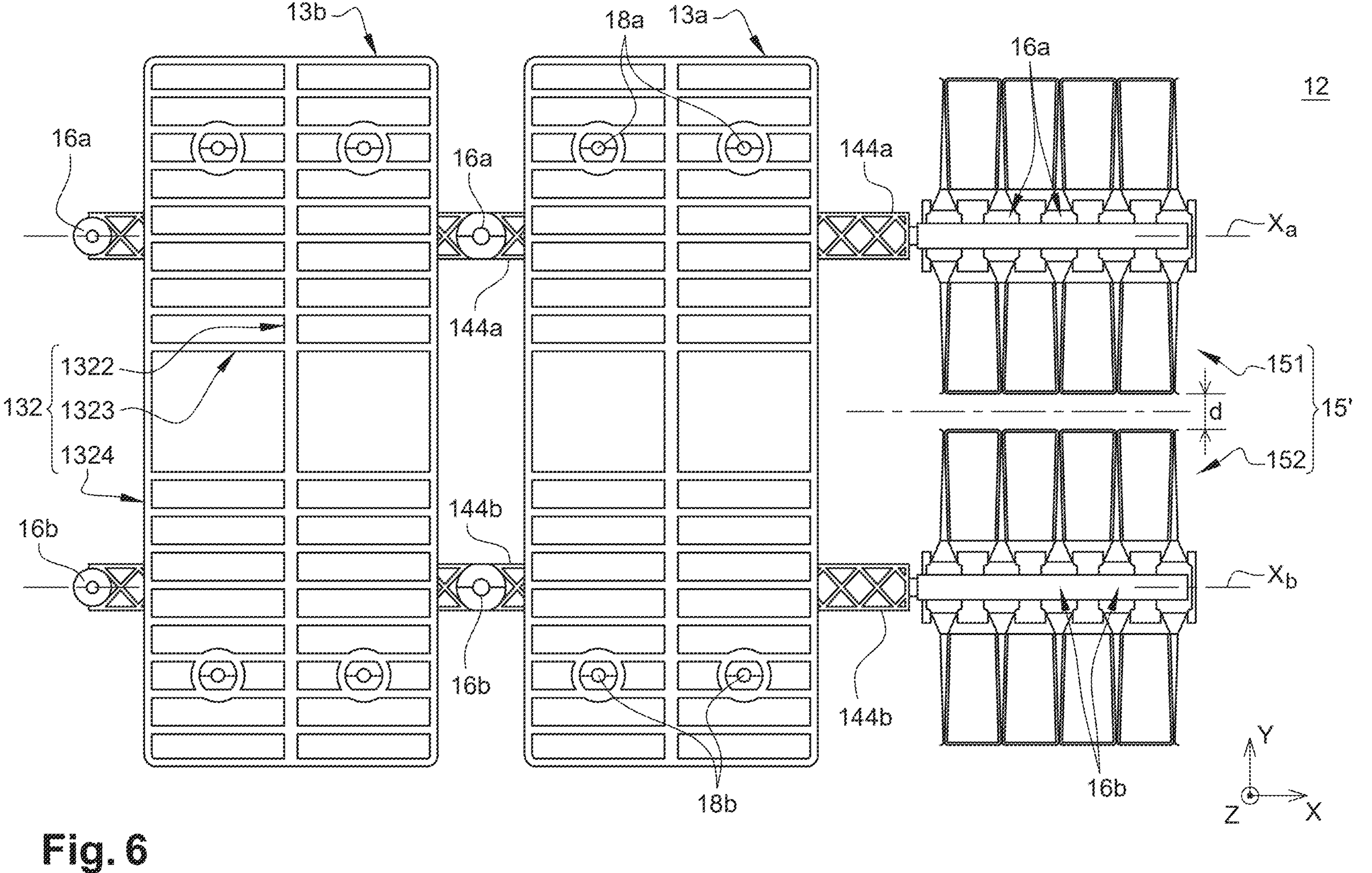
FIG. 6 is a partial top view of the electromechanical system in FIG. 5.

FIGS. 5 and 6 represent a second embodiment of the electromechanical system 2. FIG. 5 is a bottom view of part of the electromechanical system 2, similar to FIG. 2. FIG. 6 is a top view of the same part of the electromechanical system 2.

This second embodiment differs from the first embodiment mainly in that the electromechanical system 2 comprises two movable elements or pistons, rather than just one.

Thus, further to the frame 10, the first and second transmission devices 14*a*-14*b* and the capacitive detection means 15' comprising the two movable electrodes 151-152, the electromechanical system 2 comprises a first piston 13*a* and a second piston 13*b*.

The first piston 13*a* is connected, on the one hand, to the first movable electrode 151 by the first transmission device 14*a* and, on the other hand, to the second movable electrode 152 by the second transmission device 14*b*.

The second piston 13*b* is connected, on the one hand, to the first movable electrode 151 by the first transmission device 14*a* and, on the other hand, to the second movable electrode 152 by the second transmission device 14*b*.

Thus, each transmission device 14*a*, 14*b* connects the two pistons 13*a*-13*b* to the capacitive detection means 15', and more particularly to the movable electrode 151, 152 associated with said transmission device 14*a*, 14*b*.

The way in which the movable electrodes 151-152 are constructed and the way in which they are connected to the transmission devices 14*a*-14*b* have been described previously in relation to FIGS. 2, 3 and 4A-4B. The movable electrodes 151-152 in FIG. 5 are simply smaller than those in FIG. 2, in order to best represent the two pistons.

The two pistons 13*a*-13*b* are located on the same side of the capacitive detection means 15'. More precisely, the first piston 13*a* is located between the capacitive detection means 15' and the second piston 13*b*. In other words, the pistons are side by side. This configuration is advantageous because the two pistons can share the same cavity open to the outside and the same reference volume. Thus, the first zone 11 can comprise a single cavity open to the outside and a single reference volume. The distance d' separating the two pistons is, for example, between 10 μm and 600 μm.

The pistons 13*a*-13*b* are subjected to the same pressure difference. Furthermore, they are mounted so as to be able to move relative to the frame 10 in the same way, preferably in translation according to the third direction Z. Thus, the pistons 13*a*-13*b* have the same displacement.

The pistons 13*a*-13*b* each comprise a membrane 131 and a membrane rigidifying structure 132. The first piston 13*a* has an effective surface area and mass equal to or approximately equal (within 5%) to those of the second piston 13*b*. The effective surface area of a piston is defined as the surface area in contact with the first zone 11 (in other words the surface area which harvests the pressure difference).

Viewed from the front, the pistons 13*a*-13*b* preferably have the same shape, for example rectangular with rounded corners. The dimensions (length, width) of the first piston 13*a* are equal or substantially equal (to within 5%) to those of the second piston 13*b*. The width of a piston is measured in the first direction X and its length is measured in the second direction Y.

By way of example, the two pistons 13*a*-13*b* in FIG. 5 have the same length (measured in Y) as the single piston 13 in FIG. 2, but a width (measured in X) less than or equal to half that of piston 13.

For an equivalent piston surface area, the electromechanical system 2 comprising two pistons benefits from better performance, especially in terms of sensitivity and resonant frequency, because it offers a better compromise between rigidity and mass than the electromechanical system comprising a single piston (FIG. 2).

As the two pistons 13*a*-13*b* are smaller than a single piston, they are more rigid, all other things being equal (thickness, rigidifying structure, etc.), and are therefore subject to less deformation. They can be more rigid for the same (cumulative) mass or be lighter for the same level of rigidity, or even lighter while being more rigid.

The two pistons 13*a*-13*b* preferably extend parallel to each other in the direction of their length, in other words in the second direction Y.

As in the first embodiment (see FIG. 2), the first transmission device 14*a* is mounted so as to rotate relative to the frame 10 by means of a plurality of first pivot hinges 16*a*. In the embodiment shown in FIG. 5, at least one of the first pivot hinges 16*a* is located at the first movable electrode 151 and another first pivot hinge 16*a* is located at one end of the first transmission device 14*a* (beyond the second piston 13*b*). Advantageously, another first pivot hinge 16*a* is located between the pistons 13*a*-13*b*. This first pivot hinge 16*a* rigidifies the first transmission device 14*a* by holding it between the pistons 13*a*-13*b*.

Thus, each part of the first transmission device 14*a* that supports a piston is located between two pivot hinges 16*a* positioned on either side of said piston and held in rotation by these two pivot hinges 16*a*.

The second transmission device 14*b* is rotatably mounted relative to the frame 10 by means of the second pivot hinges 16*b*. The second pivot hinges 16*b* are preferably disposed in the same way as the first pivot hinges 16*a*.

In this second embodiment, each transmission device 14*a*, 14*b* comprises:

- a transmission shaft 144*a*, 144*b*, rotating about its longitudinal axis Xa, Xb and to which the movable electrode 151, 152 is connected;
- one or more transmission arms (or lever arms) 145*a*, 145*b* having a first end integral with the transmission shaft 144*a*, 144*b* and a second end coupled to the first piston 13*a;*
- one or more additional transmission arms (or lever arms) 145*c*, 145*d* having a first end integral with the transmission shaft 144*a*, 144*b* and a second end coupled to the second piston 13*b*.

The transmission shafts 144*a* and 144*b* are advantageously pierced, at least opposite the pistons 13*a*-13*b*, in order to optimise their rigidity to inertia ratio and limit damping with the pistons 13*a*-13*b*.

In particular, they may have a lattice structure facing the pistons 13*a*-13*b* which enables them to transmit movement with as little deformation as possible (while minimising inertia and damping). Apart from the pistons 13*a*-13*b*, the transmission shafts 144*a* and 144*b* can be perforated.

The first piston 13*a* and the way in which it is connected to the transmission devices 14*a*-14*b* will now be described in more detail. This description applies mutatis mutandis to the second piston 13*b*.

Facing the first piston 13*a*, the transmission shaft 144*a*, 144*b* may be configured to free up space in the central part of the first piston 13*a*, so that it can be rigidifyed.

The transmission shaft 144*a*, 144*b* may especially comprise (facing the first piston 13*a*) two portions which are inclined relative to the longitudinal axis of rotation Xa, Xb, by any suitable angle.

Alternatively, the transmission shaft 144*a*, 144*b* may be interrupted before reaching the centre line M of the first piston 13*a*. It then does not extend (longitudinally) continuously from one edge to the opposite edge of the first piston 13*a*. In other words, the transmission shaft 144*a*, 144*b* is configured so that it does not cross the centreline M of the first piston 13*a*.

In both cases, the transmission arms 145*a*, 145*b* extend in an oblique direction, and not perpendicular to the longitudinal axis of rotation Xa, Xb as in FIG. 2.

Thus, the rigidifying structure 132 for the first piston 13*a* advantageously comprises, on the side of the membrane 131 where the transmission devices 14*a*-14*b* are located, a first beam 1321 which extends along the length of the first piston 13*a*. The first beam 1321 may extend along the median line M of the first piston 13*a*, as represented in FIG. 5, or parallel to this median line M at a distance of less than a quarter of the width of the first piston 13*a*. This first beam 1321 advantageously has the same thickness as the transmission shafts 144*a*, 144*b* and the transmission arms 145*a*, 145*b*, i.e. a thickness of between 5 μm and 800 μm. It is formed at the same time as the transmission shafts and arms, by etching the substrate.

By virtue of its substantial thickness, the first beam 1321 contributes greatly to rigidifying the first piston 13*a* in its largest dimension (length) and therefore to reducing the deformation of the first piston 13*a*. It therefore results in a significant gain in performance.

The first beam 1321 preferably extends over more than 50% of the length of the first piston 13*a.*

Preferably, on this side of the membrane 131, the rigidifying structure 132 comprises only the first beam 1321.

On the other side of the membrane 131, represented by FIG. 6, the rigidifying structure 132 for the first piston 13*a* advantageously comprises a second beam 1322 superimposed on the first beam 1321. This second beam 1322 has a thickness strictly less than that of the first beam 1321. It can be formed in the second structural layer described previously, the thickness of which is between 5 μm and 50 μm. The second beam 1322 may have a length equal to that of the first beam 1321.

The second beam 1322 thus extends at least part of the first beam 1321 in the third direction Z to achieve a greater thickness. It only slightly increases the mass of the first piston 13*a* (to a lesser extent than the first beam 1321, by virtue of its smaller thickness), but considerably increases the rigidity of the piston (as this varies as a function of the cube thickness).

On the same side as the second beam 1322, the rigidifying structure 132 may further comprise edges 1323 oriented perpendicularly to the first beam 1321 (so preferably parallel to the first axis Xa). These ridges 1323 rigidify the first piston 13*a* across its width. As the width is the smallest side of the first piston 13*a*, the ridges 1323 do not need to be thick (unlike the first beam 1321). The edges 1323 preferably have the same thickness as the second beam 1322 (between 5 μm and 50 μm). Thus, they do not significantly increase the mass of the first piston 13*a*. They are also formed by etching the second structural layer. They can extend from one edge of the first piston 13*a* to the other.

At least some of the edges 1323 may come to bear against stop elements belonging to the frame of the electromechanical system 2. These stop elements, for example in the form of a beam extending opposite the edges 1323, are provided to prevent the destruction of the first piston 13*a* and the movable electrodes 151, 152, when the first piston 13*a* is subjected to a very large difference in pressure (such as during reliability tests).

Finally, the rigidifying structure 132 may comprise a frame 1324 located at the periphery of the first piston 13*a*. This frame 1324 preferably has the same thickness as the second beam 1322. It may also be formed by etching the second structural layer.

Multiplying the number of pistons considerably simplifies their rigidifying structure. The mass of the two pistons 13*a*-13*b* is reduced compared with that of piston 13 in FIG. 2, while their rigidity is increased. There is therefore a twofold gain in performance.

The electromechanical system 2 does not necessarily comprise the two movable electrodes 151-152 and the two transmission devices 154*a*-154*b*. It may comprise a single movable electrode and a single transmission device (see FIG. 7).

Figure 7:
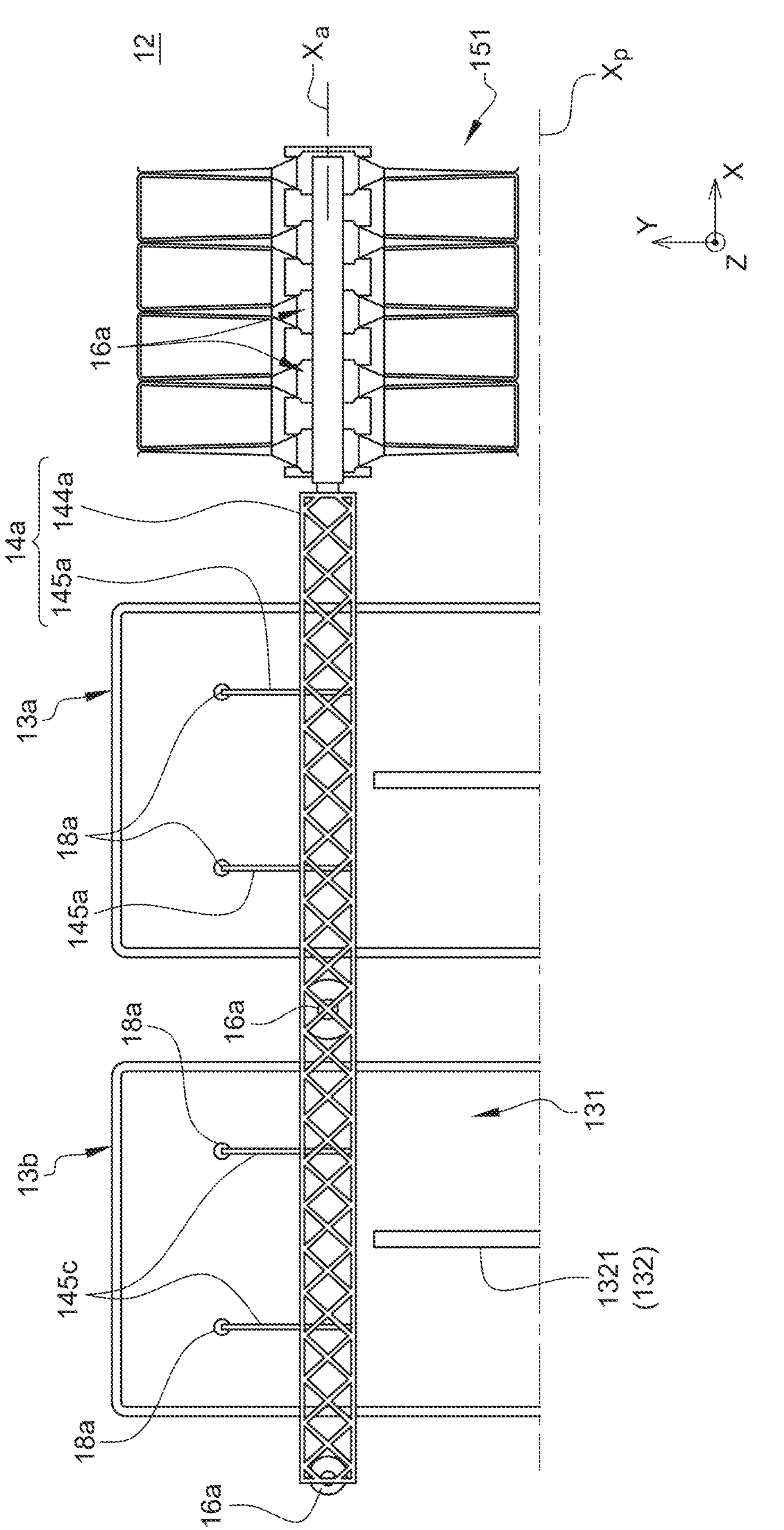
FIG. 7 is a partial bottom view of an electromechanical system according to a third embodiment.

FIG. 7 represents a third embodiment wherein the electromechanical system 2 comprises, in addition to the two pistons 13*a*-13*b*, a single movable electrode 151 (for example of the type represented by FIG. 5) and a single transmission device 14*a* (for example of the type represented by FIG. 5).

The pistons 13*a*-13*b* are here movable in rotation about an axis Xp (and not in translation), by virtue of pivot hinges (not represented) distinct from the first pivot hinges 16*a*. The rotational movement of the pistons 13*a*-13*b* (about the axis Xp) rotates the transmission shaft 144*a* of the transmission device 14*a* (about its own axis Xa), via the transmission arms 145*a*, 145*c* and the transmission shaft 144*a* moves the movable electrode 151 (here in rotation about the axis Xa).

The electromechanical system 2 is not limited to the embodiments described in relation to FIGS. 2 to 7 and many alternatives and modifications of the electromechanical system will become apparent to the person skilled in the art.

In particular, the second piston 13*b* is not necessarily connected to the same movable electrode (or electrodes) as the first piston 13*a*. Thus, the first piston 13*a* may be connected to the first movable electrode 151 by a first transmission device, while the second piston 13*b* is connected to the second movable electrode 152 by a second transmission device.

The transmission devices 14*a*-14*b*, and more particularly the transmission shafts 144*a*-144*b*, can adopt other geometries. The number of transmission arms 145*a*, 145*b* may be greater than 2.

The electromechanical system 2 may also comprise, for each transmission device 14*a*, 14*b*, one or more additional pivot hinges, not represented by the figures, between that located at each end of the transmission shaft 144*a*, 144*b* and those connecting the movable electrode 151, 152. These additional pivot hinges are preferably located in the first zone 11 and therefore do not contribute to the seal between the two zones.

In contrast, the electromechanical system of FIGS. 5 to 7 (two pistons) may include only three pivot hinges per transmission device 14*a*, 14*b*, one at the movable electrode 151, 152, one between the two pistons 13*a*-13*b* and one at the end of the transmission shaft 144*a*, 144*b* located beyond the second piston 13*b*.

The electromechanical system 2 has been described taking as an example a capacitive detection microphone comprising one or more pistons 13, 13*a*-13*b* each fitted with a membrane 131 subjected on the one hand to atmospheric pressure and on the other hand to a reference pressure. The electromechanical system can, however, form other types of capacitive detection transducer, especially a loudspeaker (sound emitter) or an ultrasound emitter (which are electroacoustic transducers), or even a differential pressure sensor.

In the case of a differential pressure sensor, the first face of the membrane 131 (of each piston) is subjected to a first pressure (not necessarily atmospheric pressure) and the second face of the membrane 131 is subjected to a second pressure, different from the first pressure. The displacement of the membrane 131, under the effect of the pressure difference, is measured by the capacitive detection means 15'. The membrane 131 of the piston is integral with the frame 10 so as to be sealed and the rigidifying structure 132 for the piston is absent or reduced so as not to anchor it to the frame.

In the case of a loudspeaker or an ultrasound transmitter, capacitive actuation means replace the capacitive detection means 15'. These capacitive actuation means also comprise two movable electrodes and at least one counter-electrode per movable electrode. The movable electrodes are moved by an electrostatic force and this movement is transmitted by the transmission devices 14*a*, 14*b* to the piston 13 or pistons 13*a*-13*b*. The movement of the membrane 131 of the piston or pistons 13, 13*a*-13*b* enables sound (or ultrasound) to be emitted.

The second zone 12 may comprise two chambers under a controlled atmosphere, one enclosing the first movable electrode 151, the other enclosing the second movable electrode 152.

The first and second zones 11-12, which are sealed, are not necessarily subjected to different pressures. The first zone 11 can also be an aggressive environment and the movable electrodes of the capacitive means (of detection or actuation) are placed in the second zone 12 to protect them from this aggressive environment (in addition to reducing viscous friction, and therefore acoustic noise).

The electromechanical system 2 may even be devoid of sealing means between the first and second zones 11-12 (which amounts to considering only one zone). More particularly, the pivot hinges 16 may be devoid of a sealed insulating element 161. In fact, the torsion blades 162 may suffice for the rotation of the transmission device 14*a*, 14*b* and as elastic "anti-pull-in" means.

The invention claimed is:

1. An electromechanical system comprising:

a frame;

a first element movable relative to the frame;

a capacitive measurement or actuation system comprising:

a first electrode movable relative to the frame; and at least one electrode fixed relative to the frame and separated from the first movable electrode by a first dielectric medium;

a first movement transmission device connecting the first movable element to the first movable electrode, the first movement transmission device being rotatably movable relative to the frame by a plurality of first pivot hinges, and a second element movable relative to the frame, wherein the second movable element is connected to the capacitive measurement or actuation system and wherein the first movable element is disposed between the capacitive measurement or actuation system and the second movable element.

2. The electromechanical system according to claim 1, wherein the first movement transmission device further connects the second movable element to the first movable electrode.

3. The electromechanical system according to claim 2, wherein the capacitive measurement or actuation system further comprises:

a second electrode movable relative to the frame; and at least one additional electrode fixed relative to the frame and separated from the second movable electrode by a second dielectric medium;

the system further comprising a second movement transmission device connecting the first movable element and the second movable element to the second movable electrode, the second movement transmission device being rotatably movable relative to the frame by a plurality of second pivot hinges.

4. The electromechanical system according to claim 2, wherein the first movement transmission device comprises:

a first transmission shaft having a first longitudinal axis of rotation;

at least one first transmission arm comprising a first end coupled to the first movable element and a second end integral with the first transmission shaft; and at least one second transmission arm comprising a first end coupled to the second movable element and a second end integral with the first transmission shaft.

5. The electromechanical system according to claim 1, wherein each of the first and second movable elements comprises a membrane and a rigidifying structure for the membrane.

6. The electromechanical system according to claim 5, wherein the first movement transmission device is located on a first side of the membrane of the first movable element and wherein the rigidifying structure for the first movable element comprises a first beam located on the first side of the membrane, the first beam extending along a lengthwise direction of the first movable element.

7. The electromechanical system according to claim 6, wherein the first beam has a length greater than or equal to 50% of the length of the first movable element.

8. The electromechanical system according to claim 6, wherein the rigidifying structure for the first movable element further comprises a second beam located on a second side opposite to the membrane and superimposed on the first beam.

9. The electromechanical system according to claim 6, wherein the rigidifying structure for the first movable element further comprises ridges located on a second opposite side of the membrane and extending perpendicularly to the first beam.

10. The electromechanical system according to claim 1, wherein the first movable element and the second movable element are identical.

11. The electromechanical system according to claim 1, wherein:

at least one of the first pivot hinges is located at the first movable electrode, another one of the first pivot hinges is located at one end of the first transmission device;

another one of the first pivot hinges is located between the first and second movable elements.

12. The electromechanical system according to claim 1, wherein the first movable element and the second movable element are in contact with a first zone and the first movable electrode is located in a second zone sealingly insulated from the first zone.

13. The electromechanical system according to claim 6, wherein the first beam extends along a median line of the first movable element.

* * * * *